(12) United States Patent
Sung

(10) Patent No.: US 11,748,876 B2
(45) Date of Patent: Sep. 5, 2023

(54) JOINT SURFACE SAFETY EVALUATION APPARATUS

(71) Applicant: FMK INC., Gumi-si (KR)

(72) Inventor: Hyun Suk Sung, Gyeongsan-si (KR)

(73) Assignee: FMK INC., Gumi-si (KR)

( * ) Notice: Subject to any disclaimer, the term of this patent is extended or adjusted under 35 U.S.C. 154(b) by 0 days.

(21) Appl. No.: 17/918,540

(22) PCT Filed: Nov. 17, 2020

(86) PCT No.: PCT/KR2020/016191
§ 371 (c)(1),
(2) Date: Oct. 12, 2022

(87) PCT Pub. No.: WO2022/075516
PCT Pub. Date: Apr. 14, 2022

(65) Prior Publication Data
US 2023/0136883 A1    May 4, 2023

(30) Foreign Application Priority Data

Oct. 5, 2020 (KR) .................. 10-2020-0128341

(51) Int. Cl.
*G06T 7/00* (2017.01)
*G06T 7/13* (2017.01)
(Continued)

(52) U.S. Cl.
CPC ............. *G06T 7/001* (2013.01); *G01C 9/06* (2013.01); *G06T 7/13* (2017.01); *G06T 7/60* (2013.01); *G06T 17/20* (2013.01); *G06T 2200/08* (2013.01); *G06T 2207/10012* (2013.01); *G06T 2207/10028* (2013.01); *G06T 2207/20081* (2013.01); *G06T 2207/20084* (2013.01); *G06T 2207/30108* (2013.01); *G06T 2210/56* (2013.01)

(58) Field of Classification Search
CPC .. G06T 7/001; G06T 7/13; G06T 7/60; G01C 9/06
See application file for complete search history.

(56) References Cited

U.S. PATENT DOCUMENTS 10,614,579 B1 * 4/2020 Kwon .................... G06T 19/20
2018/0202814 A1 * 7/2018 Kudrynski .............. G06T 7/521
2020/0018606 A1 * 1/2020 Wolcott ............. G01C 21/3848

FOREIGN PATENT DOCUMENTS

| CN | 110348125 A | * 10/2019 |
| KR | 10-1787542 B1 | 10/2017 |
| KR | 10-1891087 B1 | 8/2018 |

* cited by examiner

*Primary Examiner* — Yingchun He
(74) *Attorney, Agent, or Firm* — Heedong Chae; Lucem, PC

(57) ABSTRACT

The present disclosure relates to a joint surface safety evaluation apparatus and, more particularly, to a joint surface safety evaluation apparatus for generating mesh data consisting of a combination of a plurality of polygonal mesh surfaces, based on stereo image data generated by photographing an evaluation target surface, generating modeling data by overlapping the stereo image data and the mesh data, extracting a mesh surface corresponding to a rock slope surface by applying the modeling data to a learning model, and calculating a joint surface evaluation score regarding the evaluation target surface, by using a normal vector for each of a plurality of extracted mesh surfaces.

6 Claims, 2 Drawing Sheets

(51) Int. Cl.
*G01C 9/06* (2006.01)
*G06T 7/60* (2017.01)
*G06T 17/20* (2006.01)

JOINT SURFACE SAFETY EVALUATION APPARATUS

CROSS-REFERENCE TO RELATED APPLICATIONS

This application claims the priority of Korean Patent Application No. 10-2020-0128341 filed on Oct. 5, 2020, in the Korean Intellectual Property Office, the disclosure of which is incorporated herein by reference.

BACKGROUND OF THE INVENTION

Field of the Invention

The present disclosure relates to a joint surface safety evaluation apparatus and, more particularly, to a joint surface safety evaluation apparatus which can evaluate a safety of a joint surface by using stereo image data for the joint surface.

Description of the Related Art

Due to the new construction and straightening of expressways, the joint surfaces around the road are continuously increasing, and the size of the joint surface is increasing and an expected damage scale in case of the collapse of the joint surface is also increasing. Accordingly, it is necessary to evaluate the safety of the joint surface in order to detect and prevent the collapse of the joint surface in advance.

Conventional joint surface safety evaluation is carried out by field visits by experts, and it takes a lot of time and money to evaluate the safety of joint surfaces, and a safety evaluation result is written by an analog scheme, so it is difficult to manage whether joint surfaces in the whole country are safe and an evaluation period.

In addition, since most of the joint surfaces are located on roads near mountainous areas, it is difficult to access the joint surfaces, so there is also a problem in that it is dangerous.

Accordingly, a technique for inspecting a defect of a structure through 3D data and a 3D image through 3D laser scanning is proposed, but this conventional technique is inconvenient to separately provide a 3D laser scanner and a camera.

In addition, this conventional technique has a problem in that it cannot provide a configuration and method for predicting a defect before a defect occurs by obtaining defect information through image analysis and determining the defect information using 3D data.

SUMMARY OF THE INVENTION

The present disclosure has been made in an effort to provide a joint surface safety evaluation apparatus that can extract an area corresponding to a rock slop surface through image analysis by using stereo image data and evaluate a safety of a joint surface by using 3D data of the area corresponding to the dark slope surface.

The objects of the present disclosure are not limited to the aforementioned objects, and other objects, which are not mentioned above, will be apparent from the following description.

In order to achieve the object, an exemplary embodiment of the present disclosure provides a joint surface safety evaluation apparatus including: a data processing unit configured to receive stereo image data and GPS information generated as an evaluation target surface is captured from the outside to generate point cloud data constituted by a plurality of coordinates having a depth estimated from the stereo image data and a coordinate value corresponding to the evaluation target surface based on the GPS information; a data generation unit configured to generate mesh data constituted by a combination of a plurality of polygonal mesh surfaces from the point cloud data, and generate modeling data by overlapping the stereo image data and the mesh data; a rock slope surface extraction unit configured to extract a mesh surface corresponding to a rock slope surface by applying the modeling data to a learning model pre-learned by using a plurality of images including the rock slope surface and supervised learning values for an area corresponding to the rock slope surface in each of the plurality of images; an evaluation score calculation module configured to calculate a joint surface evaluation score based on an evaluation value output by grouping the plurality of mesh surfaces extracted by the rock slope surface extraction unit by using a normal vector for each of the plurality of mesh surfaces, calculating an inclination angle and a direction angle for each group, and applying the inclination angle and the direction angle for each group to the pre-learned learning model so as to output evaluation values for the inclination angle and the direction angle; and a safety evaluation unit configured to select and output any one of a plurality of predetermined safety degrees according to the joint surface evaluation score.

According to the present disclosure, there is an effect that an area corresponding to a rock slope surface is extracted through image analysis using stereo image data, and parts having a similar inclination or direction are grouped in each area corresponding to the rock slope surface to evaluate the safety of each group.

Further, there is an effect of evaluating the safety of the entire joint surface by applying the safety of each group and the ratio of the area occupied by each group to the total area.

According to the present disclosure, the effect of evaluating the safety of the joint surface in consideration of both the inclination of the joint surface and the presence of cracks can be expected.

The effects of the present disclosure are not limited to the aforementioned effect, and other effects, which are not mentioned above, will be apparent to a person having ordinary skill in the art from the description of the claims.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Figure 1:
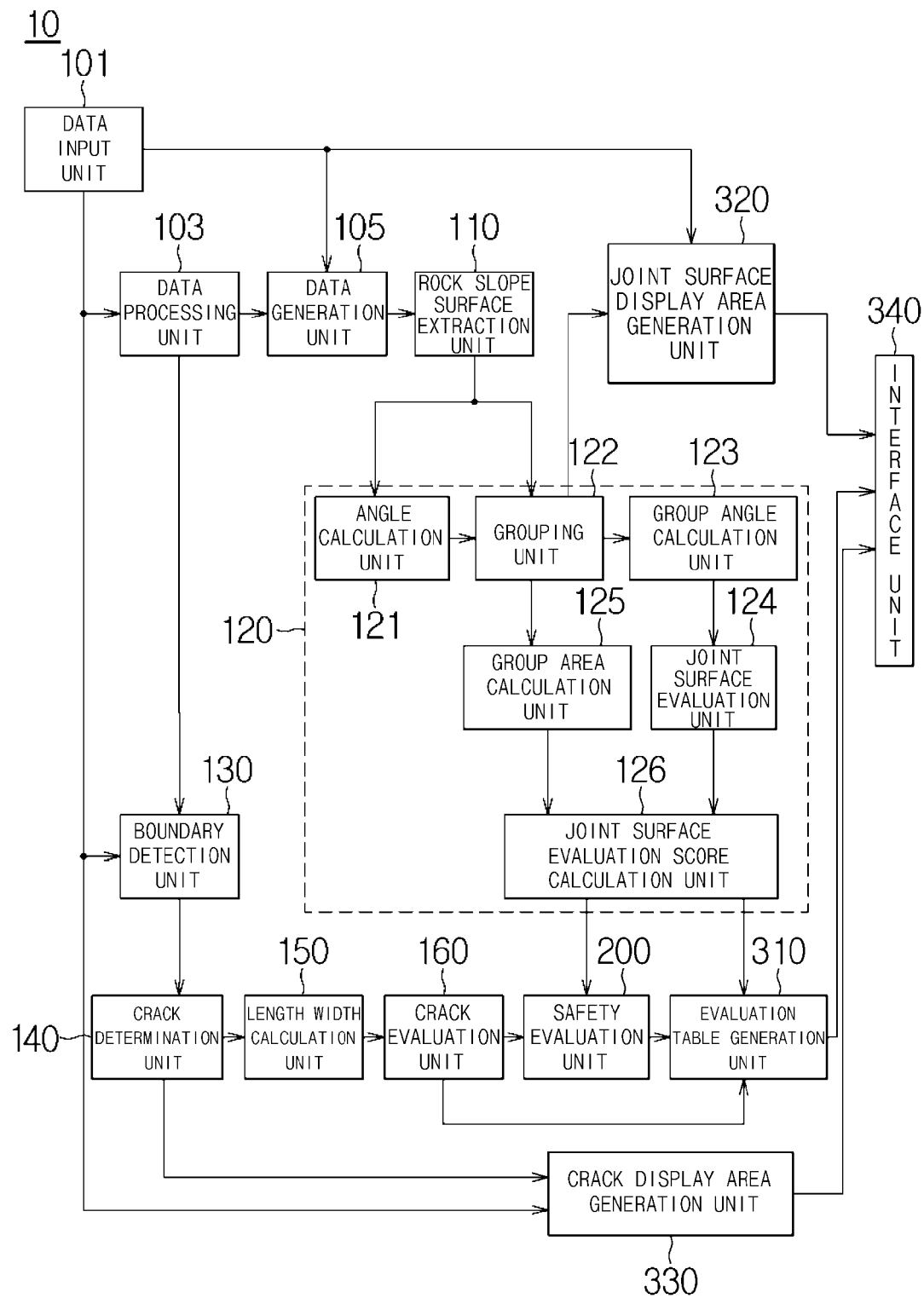
FIG. 1 is a block diagram of a joint surface safety evaluation apparatus according to an exemplary embodiment of the present disclosure.

A joint surface safety evaluation apparatus according to an aspect of the present disclosure includes: a data processing unit configured to receive stereo image data and GPS information generated as an evaluation target surface is captured from the outside to generate point cloud data constituted by a plurality of coordinates having a depth estimated from the stereo image data and a coordinate value corresponding to the evaluation target surface based on the GPS information; a data generation unit configured to generate mesh data constituted by a combination of a plurality of polygonal mesh surfaces from the point cloud data, and generate modeling data by overlapping the stereo image data and the mesh data; a rock slope surface extraction unit configured to extract a mesh surface corresponding to a rock slope surface by applying the modeling data to a learning model pre-learned by using a plurality of images including the rock slope surface and supervised learning values for an area corresponding to the rock slope surface in each of the plurality of images; an evaluation score calculation module configured to calculate a joint surface evaluation score based on an evaluation value output by grouping the plurality of mesh surfaces extracted by the rock slope surface extraction unit by using a normal vector for each of the plurality of mesh surfaces, calculating an inclination angle and a direction angle for each group, and applying the inclination angle and the direction angle for each group to the pre-learned learning model so as to output evaluation values for the inclination angle and the direction angle; and a safety evaluation unit configured to select and output any one of a plurality of predetermined safety degrees according to the joint surface evaluation score.

Here, the evaluation score calculation module includes an angle calculation unit configured to calculate the inclination angle and the direction angle for each mesh surface by comparing the normal vector for each of the plurality of mesh surfaces extracted by the rock slope surface extraction unit and a predetermined reference vector, a grouping unit configured to group the plurality of mesh surfaces according to the inclination angle and the direction angle, and assigning a group identifier for distinguishing from another group, a group angle calculation unit configured to calculate the inclination angle and the direction angle for each group by using the inclination angle and the direction angle belonging to each group, respectively, and match each of the inclination angle and the direction angle with the group identifier, a joint surface evaluation unit configured to receive the inclination angle and the direction angle and apply the inclination angle and the direction angle for each group to the pre-learned learning model so as to output the evaluation value for the inclination angle and the direction, thereby outputting a joint surface evaluation value for each group, and a joint surface evaluation score calculation unit configured to calculate the joint surface evaluation score by using the joint surface evaluation value for each group.

The joint surface safety evaluation apparatus further includes a group area calculation unit configured to calculate a group area value corresponding to mesh surfaces belonging to each group by using a plurality of coordinates constituting each of the mesh surfaces belonging to each group, and match the group area value with the group identifier.

Here, the joint surface evaluation score calculation unit calculates the joint surface evaluation score by applying a weight according to the group area value for each group to the joint surface evaluation value for each group output by the joint surface evaluation unit, and accumulating the weight.

The joint surface safety evaluation apparatus according to an aspect of the present disclosure further includes: a boundary detection unit configured to detect a boundary by receiving the stereo image data, and extract a plurality of boundary coordinates which are coordinates corresponding to the detected boundary among the plurality of coordinates of the point cloud data; a crack determination unit configured to select and output any one of a first classification value corresponding to a crack or a second classification value corresponding to a non-crack by applying the stereo image data to the pre-learned learning model so as to discriminate the crack or the non-crack by receiving the stereo image data; a length width calculation unit configured to calculate each of a length and a width of the crack by using the plurality of boundary coordinates when the first classification value is output; and a crack evaluation unit configured to output a crack evaluation value by applying the length and the width of the crack to the pre-learned learning model so as to output the crack evaluation value for the length and the width of the crack by receiving the length and the width of the crack, and the safety evaluation unit selects and outputs any one of a plurality of predetermined safety degrees according to a value acquired by summing the crack evaluation value and the joint surface evaluation score.

Advantages and features of the present disclosure, and methods for accomplishing the same will be more clearly understood from embodiments described in detail below with reference to the accompanying drawings. However, the present disclosure is not limited to the following embodiments but may be implemented in various different forms. The embodiments are provided only to make description of the present disclosure complete and to fully provide the scope of the present disclosure to a person having ordinary skill in the art to which the present disclosure pertains, and the present disclosure will be just defined by the appended claims. Meanwhile, it is also to be understood that the terminology used herein is for the purpose of describing embodiments only and is not intended to limit the present disclosure. In the present specification, the singular form also includes the plural form, unless the context indicates otherwise.

FIG. 1 is a block diagram of a joint surface safety evaluation apparatus according to an exemplary embodiment of the present disclosure, and referring to FIG. 1, a joint surface safety evaluation apparatus 10 according to an exemplary embodiment of the present disclosure may include a data input unit 101, a data processing unit 103, a data generation unit 105, a rock slope surface extraction unit 110, an evaluation score calculation module 120, a boundary detection unit 130, a crack determination unit 140, a length width calculation unit 150, a crack evaluation unit 160, a safety evaluation unit 200, an evaluation table generation unit 310, a joint surface display area generation unit 320, a crack display area generation unit 330, and an interface unit 340.

The data input unit 101 may receive stereo image data and GPS information generated as a terminal captures an evaluation target surface from a terminal including a stereo vision camera and a GPS information collection device, and a communication unit which enables communication with the outside.

Here, the evaluation target surface means a joint surface which becomes a target of safety evaluation.

The data processing unit 103 receives the stereo image data and the GPS information generated as the evaluation target surface is photographed from the outside to generate point cloud data constituted by a plurality of coordinates having a depth estimated from the stereo image data and a coordinate value corresponding to the evaluation target surface based on the GPS information.

Here, the point cloud data may be constituted by a plurality of coordinates including a color value corresponding to each pixel of the stereo image data and x, y, and z-axis coordinate values for each pixel.

The data processing unit 103 may receive, from the data input unit 101, the stereo image data and the GPS information generated as the evaluation target surface is photographed and estimate the depth from the stereo image data, and set a reference plane based on the GPS information and generate point cloud data constituted by a plurality of coordinates having coordinates values corresponding to the evaluation target surface of the stereo image data based on the reference plane.

Here, the reference plane may have a height set according to the altitude or elevation of a location corresponding to the GPS information.

The data processing unit 103 may generate point cloud data constituted by a plurality of coordinates having coordinate values corresponding to the evaluation target surface by further using wide angle information of a camera pre-stored for each stereo vision camera.

The data generation unit 105 may generate mesh data constituted by a combination of a plurality of polygonal mesh surfaces from the point cloud data, and generate modeling data by overlapping the stereo image data and the mesh data.

The data generation unit 105 may use Poisson Equation to generate mesh data constituted by a combination of a plurality of polygonal mesh surfaces from the point cloud data, and generate modeling data by overlapping the stereo image data and the mesh data.

The rock slope surface extraction unit 110 may extract a mesh surface corresponding to the rock slope surface by applying the modeling data generated by the data generation unit 105 to a learning model pre-learned by using a plurality of images including the rock slope surface and supervised learning values for the area corresponding to the rock slope surface in each of the plurality of images.

Here, the learning model as a neural network structure including an input layer, a plurality of convolution layers, a plurality of pooling layers, and a plurality of relu layers may be pre-learned as the area corresponding to the rock slope surface is extracted from each of the plurality of images by receiving the plurality of images including the rock slope surface and parameters of a predetermined neural network structure are organized by receiving the supervised learning value corresponding to each of the plurality of images corresponding to the rock slope surface.

The pre-learned learning model may select a rock slope surface area including the rock slope surface by receiving the modeling data, and select anyone of a first determination value corresponding to the rock slope surface and a second determination value corresponding to those (e.g., grassland, sky, etc.) other than the rock slope surface according to whether the selected rock slope surface area is the rock slope surface, and match the selected determination value with the slope surface area.

The rock slope surface extraction unit 110 may extract mesh surfaces corresponding to the rock slope surface area matching the first determination value by applying the modeling data generated by the data generation unit 105 to the pre-learned learning model.

The evaluation score calculation module 120 may calculate a joint surface evaluation score based on an evaluation value output by grouping the plurality of mesh surfaces extracted by the rock slope surface extraction unit 110 by using a normal vector for each of the plurality of mesh surfaces, calculating an inclination angle and a direction angle for each group, and applying the inclination angle and the direction angle for each group to the learning model pre-learned so as to output evaluation values for the inclination angle and the direction angle.

The evaluation score calculation module 120 may include an angle calculation unit 121, a grouping unit 122, a group angle calculation unit 123, a joint surface evaluation unit 124, a group area calculation unit 125, and a joint surface evaluation score calculation unit 126.

The angle calculation unit 121 may calculate the inclination angle and the direction angle for each mesh surface by comparing the normal vector for each of the plurality of mesh surfaces extracted by the rock slope surface extraction unit 110 and a predetermined reference vector.

The angle calculation unit 121 may calculate the inclination angle by comparing the normal vector for each of the plurality of mesh surfaces extracted by the rock slope surface extraction unit 110 and a horizontal reference vector horizontal to a predetermined reference plane based on the GPS information, and calculate the direction angle by comparing the normal vector for each of the plurality of mesh surfaces extracted by the rock slope surface extraction unit 110 and a direction reference vector corresponding to a predetermined direction (e.g., the north).

The grouping unit 122 may group the plurality of mesh surfaces extracted by the rock slope surface extraction unit 110 according to the inclination direction and the direction angle, and grant a group identifier for distinguishing from another group.

The grouping unit 122 may group the plurality of mesh surfaces according to a distribution of the plurality of mesh surfaces extracted by the rock slope surface extraction unit 110 according to the inclination direction and the direction angle, and grant the group identifier for distinguishing from another group.

The group angle calculation unit 123 may calculate the inclination angle and the direction angle for each group by using the inclination angle and the direction angle belong to each group, respectively, and match each of the inclination angle and the direction angle with the group identifier.

The group angle calculation unit 123 may calculate the inclination angle and the direction angle for each group, respectively by averaging the inclination angle and the directional of the mesh surfaces which belong to each group, respectively, and match each of the inclination angle and the direction angle with the group identifier.

According to the present disclosure, the evaluation target surface may be divided into a plurality of groups according to an inclination and a direction, and the inclination angle and the direction angle of each group may be calculated.

Accordingly, the safety of the evaluation target surface is classified and evaluated for each group using the inclination angle and the direction angle of each group.

The joint surface evaluation unit 124 receives the inclination angle and the direction angle and applies the inclination angle and the direction angle for each group to the pre-learned learning model so as to be able to output the evaluation value for the inclination angle and the direction, thereby outputting a joint surface evaluation value for each group.

Here, the learning model may be pre-learned as parameters of a predetermined function are organized by receiving a plurality of inclination angles, a plurality of direction angles, and a plurality of evaluation values corresponding to the plurality of inclination angles and the plurality of direction angles, respectively as the supervised learning values.

For example, the joint surface evaluation unit 124 may receive the inclination angle and the direction angle, and output evaluation values between 0 and 3 for each of the inclination angle and the direction angle.

The group area calculator 125 may use a plurality of coordinates constituting each of the mesh surfaces belonging to each group to calculate a group area value corresponding to the mesh surfaces belonging to each group and to match a group area value with the group identifier.

The group area calculation unit 125 may calculate an area value of each mesh surface by using the plurality of coordinates constituting each of the mesh surfaces, and calculate a group area value which is an area occupied by the mesh surfaces belonging to each group as the area values of the mesh surfaces belonging to each group are summed, and calculate the group area value for each group by matching the group identifier.

The joint surface evaluation score calculation unit 126 may calculate a joint surface evaluation score by using the joint evaluation value for each group output by the joint surface evaluation unit 124.

The joint surface evaluation score calculation unit 126 may calculate the joint surface evaluation score by applying a weight according to the group area value for each group to the joint surface evaluation value for each group output by the joint surface evaluation unit 124.

For example, the evaluation target surface is divided into two groups, A and B, and when the joint surface evaluation value for the inclination angle of group A is 1, the joint surface evaluation value for the direction angle is 1, and the area value is 10 and the joint surface evaluation value for the inclination angle of group B is 3, the joint surface evaluation value for the direction angle is 2, and the area value is 20, the joint surface evaluation score calculation unit 126 may calculate a joint surface evaluation score of 4.67 as a weight (⅓ in the case of A and ⅔ in the case of B) according to the area of each group is applied to the joint surface evaluation value for each group, and accumulated.

$$1*(1/3)+1*(1/3)+3*(2/3)+3*(2/3)=4.67$$

The joint surface evaluation score calculation unit 126 calculates the joint surface evaluation score by applying a weight proportional to the group area value for each group to the joint surface evaluation value for each group for the same group and accumulating the weight to calculate the joint surface evaluation score for the entirety of the evaluation target surface by applying the evaluation value according to the safety of each group belonging to the evaluation target surface according to the area occupied by each group.

In the joint surface safety evaluation apparatus 10 according to the exemplary embodiments of the present disclosure, the evaluation score calculation module 120 may divide the evaluation target surface into a plurality of groups according to the normal vector of the mesh surfaces corresponding to the evaluation target surface, and evaluate the safety for each divided group.

In addition, the safety evaluation value of each group is reflected differently according to the area occupied by each group to calculate the joint evaluation score indicating the safety of the joint surface for the entire evaluation target surface.

According to the present disclosure, there is an advantage that more detailed safety evaluation is possible by evaluating the safety of each part by dividing the evaluation target surface according to the inclination the and direction and evaluating the safety of the evaluation target surface according to the area occupied by each part.

The boundary detection unit 130 may detect a boundary by receiving the stereo image data, and extract a plurality of boundary coordinates which are coordinates corresponding to the detected boundary among the plurality of coordinates of the point cloud data generated by the data processing unit 103.

The crack determination unit 140 may select and output anyone of a first classification value corresponding to a crack or a second classification value corresponding to a non-crack by applying the stereo image data to the pre-learned learning model so as to discriminate the crack or the non-crack by receiving the stereo image data.

Here, the crack determination unit 140 may include a learning model of a neural network structure including an input layer, a plurality of convolution layers, a plurality of pooling layers, and a plurality of relu layers.

The learning model may be pre-learned as parameters of a predetermined neural network structure are organized by receiving a plurality of images corresponding to the crack, a plurality of images corresponding to the non-crack, and supervised learning values corresponding to the plurality of images corresponding to the crack or the plurality of images corresponding to the non-crack, respectively.

When the first classification value is output by the crack determination unit 140, the length width calculation unit 150 may calculate a length and a width of each crack using the plurality of boundary coordinates extracted by the boundary detection unit 130.

The crack evaluation unit 160 may output the crack evaluation value for the evaluation target surface by applying the length and the width of the crack calculated by the length width calculation unit 150 to the pre-learned learning model so as to output the crack evaluation value for the length and the width of the crack by receiving the length and the width of the crack.

For example, the crack evaluation unit 160 may output a value between 0 and 4 as the crack evaluation value for the evaluation target surface, but is not limited thereto.

The safety evaluation unit 200 may select and output any one of a plurality of predetermined safety grades according to the joint surface evaluation score calculated by the evaluation score calculation module 120.

The safety evaluation unit 200 may select and output any one of the plurality of predetermined safety grades according to a value acquired by summing up the joint surface evaluation score calculated by the evaluation score calculation module 120 and the crack evaluation value for the evaluation target surface output by the crack evaluation unit 160.

The safety evaluation unit 200 may acquire any one range to which the value acquired by summing up the joint surface evaluation score calculated by the evaluation score calculation module 120 and the crack evaluation value output by the crack evaluation unit 160 belongs among ranges corresponding to the plurality of predetermined safety degrees, respectively, and select and output the safety degree corresponding to any one acquired range.

Table 1 below shows, as an example, the plurality of predetermined safety degrees and a range corresponding to each safety degree when the range of the joint surface evaluation score is in the range of 0 to 6, the range of the crack evaluation value is in the range of 0 to 4, and the range of the value acquired by summing the joint surface evaluation score and the crack evaluation value is in the range of 0 to 10.

TABLE 1

| Range | Safety degree |
| --- | --- |
| 8.5 or more and 10 or less | D |
| 5.5 or more and less than 8.5 | C |
| More than 2 and less than 5.5 | B |
| 2 or less | A |

Referring to Table 1, when the joint surface evaluation score for any one evaluation target surface is 4.67 and the crack evaluation value is 2, the safety evaluation unit 200 may evaluate the safety for the evaluation target surface by selecting and outputting a safety degree C. among a plurality of predetermined safety degrees A, B, C, and D.

The evaluation table generation unit 310 may generate an evaluation table for displaying the joint surface evaluation score, the crack evaluation value, and the safety degree by inputting each of the joint surface evaluation score calculated by the evaluation score calculation module 120, the crack evaluation value for the evaluation target surface output by the crack evaluation unit 160, and the safety degree output by the safety evaluation unit 200 into a prestored evaluation table template.

Here, the evaluation table template may include a plurality of items corresponding to each of the joint surface evaluation score, the crack evaluation value, and the safety degree, and a plurality of input areas for receiving data corresponding to each item.

The joint surface display area generation unit 320 may generate a joint surface display area for separately displaying the plurality of mesh surfaces distinguished for each group as different colors for each group in the stereo image data.

When the first classification value is output by the crack determination unit 140, the crack display area generation unit 330 may generate the crack display area for displaying an area surrounded by the plurality of boundary coordinates extracted by the boundary detection unit 130 to be distinguished in the stereo image data.

The interface unit 340 may selectively output any one of the evaluation table generated by the evaluation table generation unit 310, the joint surface display area generated by the joint surface display area generation unit 320, and the crack display area generated by the crack display area generation unit 330.

Figure 2:
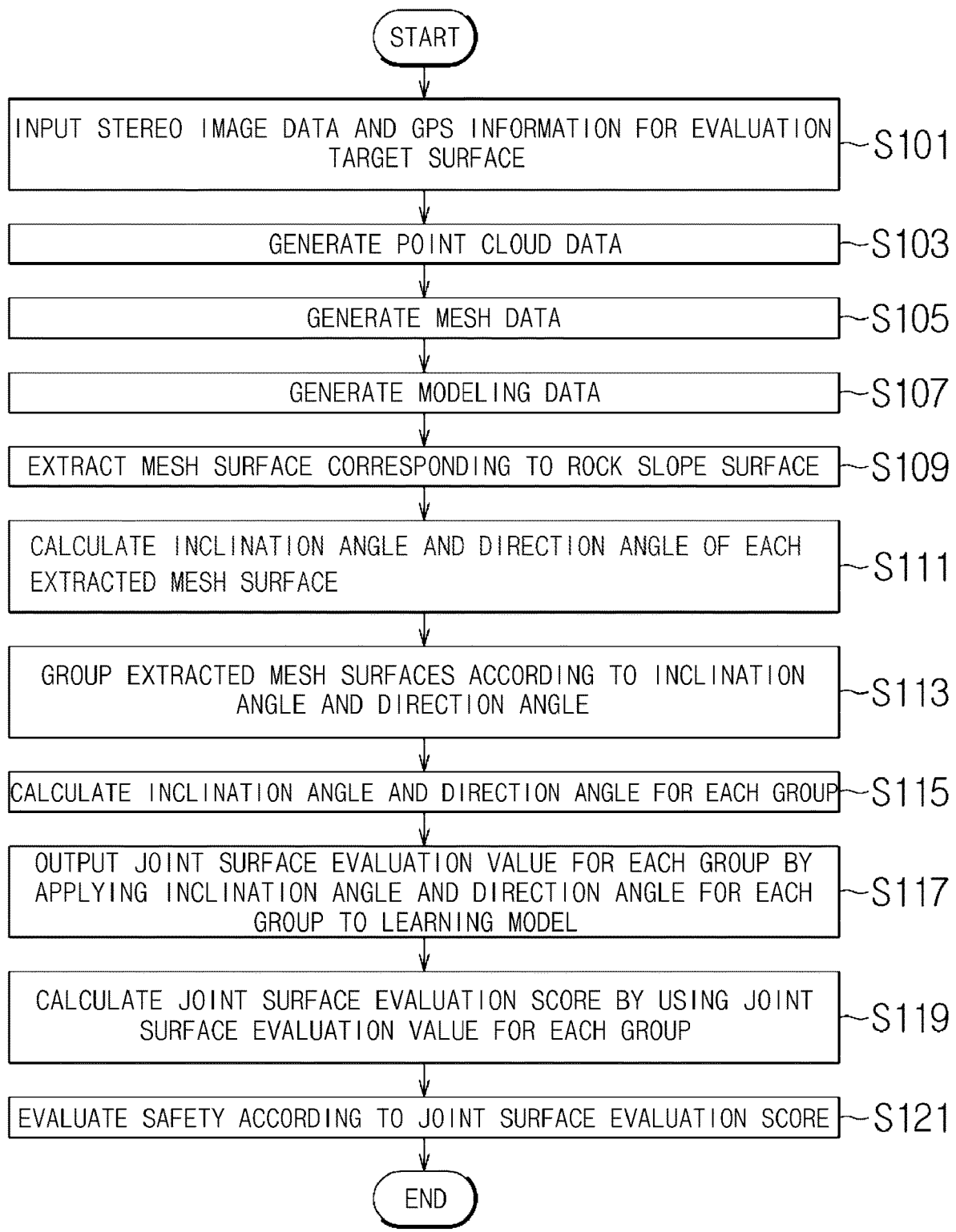
FIG. 2 is a flowchart of a joint surface safety evaluation method according to another exemplary embodiment of the present disclosure.

FIG. 2 is a flowchart of a joint surface safety evaluation method according to another exemplary embodiment of the present disclosure, and the joint surface safety evaluation method according exemplary embodiment of the present disclosure may be performed by the joint surface safety evaluation apparatus 10 according to an exemplary embodiment of the present disclosure.

Hereinafter, overlapped contents and configurations with the joint surface safety evaluation apparatus 10 described above coincide with reference numerals, and detailed descriptions will be omitted for convenience of description.

The joint surface safety evaluation apparatus 10 receives stereo image data and GPS information generated by capturing the evaluation target surface from the outside (S101), and generates the point cloud data using the received stereo image data and GPS information (S103).

The joint surface safety evaluation apparatus 10 generates mesh data from the point cloud data (S105) and generates modeling data by overlapping the mesh data and the stereo image data (S107).

The joint surface safety evaluation apparatus 10 extracts a plurality of mesh surfaces corresponding to the rock slope surface in the modeling data by applying the modeling data to including the image data to the pre-learned learning model so as to extract the area corresponding to the rock slope surface by receiving the image data (S109), compares the normal vector of each extracted mesh surface and a predetermined reference vector and calculates the inclination angle and the direction angle of each extracted mesh surface (S111), and groups the plurality of extracted mesh surfaces according to the inclination angle and the direction angle (S113).

Thereafter, the joint surface safety evaluation apparatus 10 calculates the inclination angle and the direction angle for each group by using the inclination angle and the direction angle of the mesh surface belonging to each group (S115), outputs the joint surface evaluation value for each group by applying the inclination angle and the direction angle for each group to the pre-learned learning model so as to output the joint surface evaluation value for the inclination angle and the direction angle (S117), calculates the joint surface evaluation score for the evaluation target surface by using the output joint surface evaluation value for each group (S119), and evaluates the safety for the evaluation target surface by selecting and outputting any one of the plurality of predetermined safety degrees according to the joint surface evaluation score (S121).

The joint surface safety evaluation apparatus 10 may further include a step of calculating the area value for each group by using the plurality of coordinates constituting the mesh surface belong to each group between a step (S113) of grouping the plurality of mesh surfaces and a step (S121) of calculating the joint surface evaluation score, and calculate the joint surface evaluation score by applying the weight according to the area value for each group to the joint surface evaluation value for each group.

According to the exemplary embodiments of the present disclosure, a GPS information collection apparatus and a stereo vision camera are installed in a movable device such as a drone to collect image data of the joint surface and analyze the collected image data to evaluate the safety of the joint surface, so that an operator may evaluate the safety of the joint surface without visiting the site in person.

More specifically, according to the exemplary embodiments of the present disclosure, modeling data for the evaluation target surface is generated by overlapping stereo image data including color information and mesh data including mesh surfaces made of a combination of the mesh surfaces, and modeling, and the mesh surface corresponding to the rock slope surface is extracted from the modeling data, and the safety evaluation may be performed using the normal vector of the extracted mesh surface.

That is, according to the present disclosure, there is an advantage in that the calculation is simplified but the accuracy of the safety evaluation is enhanced by extracting the mesh surface corresponding to the rock slope surface through image analysis and performing the safety evaluation on the extracted mesh surface.

In addition, according to the present disclosure, the rock slope surface may be classified in detail according to the inclination and the direction by using the normal vector of the mesh surfaces extracted as the rock slope surface.

As a result, each divided part on the stereo image data may be displayed to be distinguished, and the safety of each divided part may be evaluated.

Moreover, the weight is applied to an evaluation value which is index indicating the safety of each divided part according to the area occupied by each part to perform the safety evaluation for the entire evaluation target surface.

According to other exemplary embodiments, it is determined whether the crack exists on the evaluation target surface, and if there is the crack, the evaluation value according to the size of the crack and the joint evaluation score according to the inclination and direction of the evaluation target surface are reflected to perform the safety evaluation for the evaluation target surface.

It will be appreciated that those skilled in the technical field to which the present disclosure belongs may be implemented in other specific forms without changing the technical spirit or essential features. Therefore, it should be appreciated that the aforementioned embodiments are illustrative in all aspects and are not restricted. The scope of the present disclosure is represented by claims to be described below rather than the detailed description, and it is to be interpreted that the meaning and scope of the claims and all the changes or modified forms derived from the equivalents thereof come within the scope of the present disclosure.

The joint surface safety evaluation apparatus according to the present disclosure can be used in technical fields such as safety evaluation and monitoring of the joint surface.

What is claimed is:

1. A joint surface safety evaluation apparatus comprising:
one or more processors;
a memory coupled to the one or more processors and configured to store instructions, which, when executed by the one or more processors, causes the one or more processors to perform operations comprising:
receiving stereo image data from a stereo vision camera and GPS information generated as an evaluation target surface from a GPS information collection device is captured from the outside to generate point cloud data constituted by a plurality of coordinates having a depth estimated from the stereo image data and a coordinate value corresponding to the evaluation target surface based on the GPS information;
generating mesh data constituted by a combination of a plurality of polygonal mesh surfaces from the point cloud data, and generating modeling data by overlapping the stereo image data and the mesh data;
extracting a mesh surface corresponding to a rock slope surface by applying the modeling data to a learning model pre-learned by using a plurality of images including the rock slope surface and supervised learning values for an area corresponding to the rock slope surface in each of the plurality of images;
calculating a joint surface evaluation score based on an evaluation value output by grouping the plurality of extracted mesh surfaces by using a normal vector for each of the plurality of mesh surfaces, calculating an inclination angle and a direction angle for each group, and applying the inclination angle and the direction angle for each group to the pre-learned learning model so as to output evaluation values for the inclination angle and the direction angle;
detecting a boundary by receiving the stereo image data, and extracting a plurality of boundary coordinates which are coordinates corresponding to the detected boundary among the plurality of coordinates of the point cloud data;
electing and outputting any one of a first classification value corresponding to a crack or a second classification value corresponding to a non-crack by applying the stereo image data to the pre-learned learning model so as to discriminate the crack or the non-crack by receiving the stereo image data;
calculating each of a length and a width of the crack by using the plurality of boundary coordinates when the first classification value is output;
outputting a crack evaluation value by applying the length and the width of the crack to the pre-learned learning model so as to output the crack evaluation value for the length and the width of the crack by receiving the length and the width of the crack; and
selecting and outputting any one of a plurality of predetermined safety degrees according to a value acquired by summing the crack evaluation value and the joint surface evaluation score.

2. The joint surface safety evaluation apparatus of claim 1, wherein the step of calculating a joint surface evaluation score includes
calculating the inclination angle and the direction angle for each mesh surface by comparing the normal vector for each of the plurality of extracted mesh surfaces and a predetermined reference vector,
grouping the plurality of mesh surfaces according to the inclination angle and the direction angle, and assigning a group identifier for distinguishing from another group,
calculating the inclination angle and the direction angle for each group by using the inclination angle and the direction angle belonging to each group, respectively, and matching each of the inclination angle and the direction angle with the group identifier,
receiving the inclination angle and the direction angle and applying the inclination angle and the direction angle for each group to the pre-learned learning model so as to output the evaluation value for the inclination angle and the direction, thereby outputting a joint surface evaluation value for each group, and
calculating the joint surface evaluation score by using the joint surface evaluation value for each group.

3. The joint surface safety evaluation apparatus of claim 1, wherein the operations further comprising:
calculating a group area value corresponding to mesh surfaces belonging to each group by using a plurality of coordinates constituting each of the mesh surfaces belonging to each group, and matching the group area value with the group identifier,
wherein the joint surface evaluation score is calculated by applying a weight according to the group area value for each group to the joint surface evaluation value for each group output and accumulating the weight.

4. A non-transitory computer-readable medium storing one or more instructions, which, when executed by one or more processors, cause one or more processors to perform operations comprising:
receiving stereo image data from a stereo vision camera and GPS information generated as an evaluation target surface from a GPS information collection device is captured from the outside to generate point cloud data constituted by a plurality of coordinates having a depth estimated from the stereo image data and a coordinate value corresponding to the evaluation target surface based on the GPS information;
generating mesh data constituted by a combination of a plurality of polygonal mesh surfaces from the point cloud data, and generating modeling data by overlapping the stereo image data and the mesh data;

extracting a mesh surface corresponding to a rock slope surface by applying the modeling data to a learning model pre-learned by using a plurality of images including the rock slope surface and supervised learning values for an area corresponding to the rock slope surface in each of the plurality of images;

calculating a joint surface evaluation score based on an evaluation value output by grouping the plurality of extracted mesh surfaces by using a normal vector for each of the plurality of mesh surfaces, calculating an inclination angle and a direction angle for each group, and applying the inclination angle and the direction angle for each group to the pre-learned learning model so as to output evaluation values for the inclination angle and the direction angle;

detecting a boundary by receiving the stereo image data, and extracting a plurality of boundary coordinates which are coordinates corresponding to the detected boundary among the plurality of coordinates of the point cloud data;

selecting and outputting any one of a first classification value corresponding to a crack or a second classification value corresponding to a non-crack by applying the stereo image data to the pre-learned learning model so as to discriminate the crack or the non-crack by receiving the stereo image data;

calculating each of a length and a width of the crack by using the plurality of boundary coordinates when the first classification value is output;

outputting a crack evaluation value by applying the length and the width of the crack to the pre-learned learning model so as to output the crack evaluation value for the length and the width of the crack by receiving the length and the width of the crack; and selecting and outputting any one of a plurality of predetermined safety degrees according to a value acquired by summing the crack evaluation value and the joint surface evaluation score.

5. The non-transitory computer-readable medium of claim 4, wherein the step of calculating a joint surface evaluation score includes calculating the inclination angle and the direction angle for each mesh surface by comparing the normal vector for each of the plurality of extracted mesh surfaces and a predetermined reference vector, grouping the plurality of mesh surfaces according to the inclination angle and the direction angle, and assigning a group identifier for distinguishing from another group, calculating the inclination angle and the direction angle for each group by using the inclination angle and the direction angle belonging to each group, respectively, and matching each of the inclination angle and the direction angle with the group identifier, receiving the inclination angle and the direction angle and applying the inclination angle and the direction angle for each group to the pre-learned learning model so as to output the evaluation value for the inclination angle and the direction, thereby outputting a joint surface evaluation value for each group, and calculating the joint surface evaluation score by using the joint surface evaluation value for each group.

6. The non-transitory computer-readable medium of claim 4, wherein the operations further comprising:

calculating a group area value corresponding to mesh surfaces belonging to each group by using a plurality of coordinates constituting each of the mesh surfaces belonging to each group, and matching the group area value with the group identifier, wherein the joint surface evaluation score is calculated by applying a weight according to the group area value for each group to the joint surface evaluation value for each group output and accumulating the weight.

* * * * *